United States Patent Office 2,706,668
Patented Apr. 19, 1955

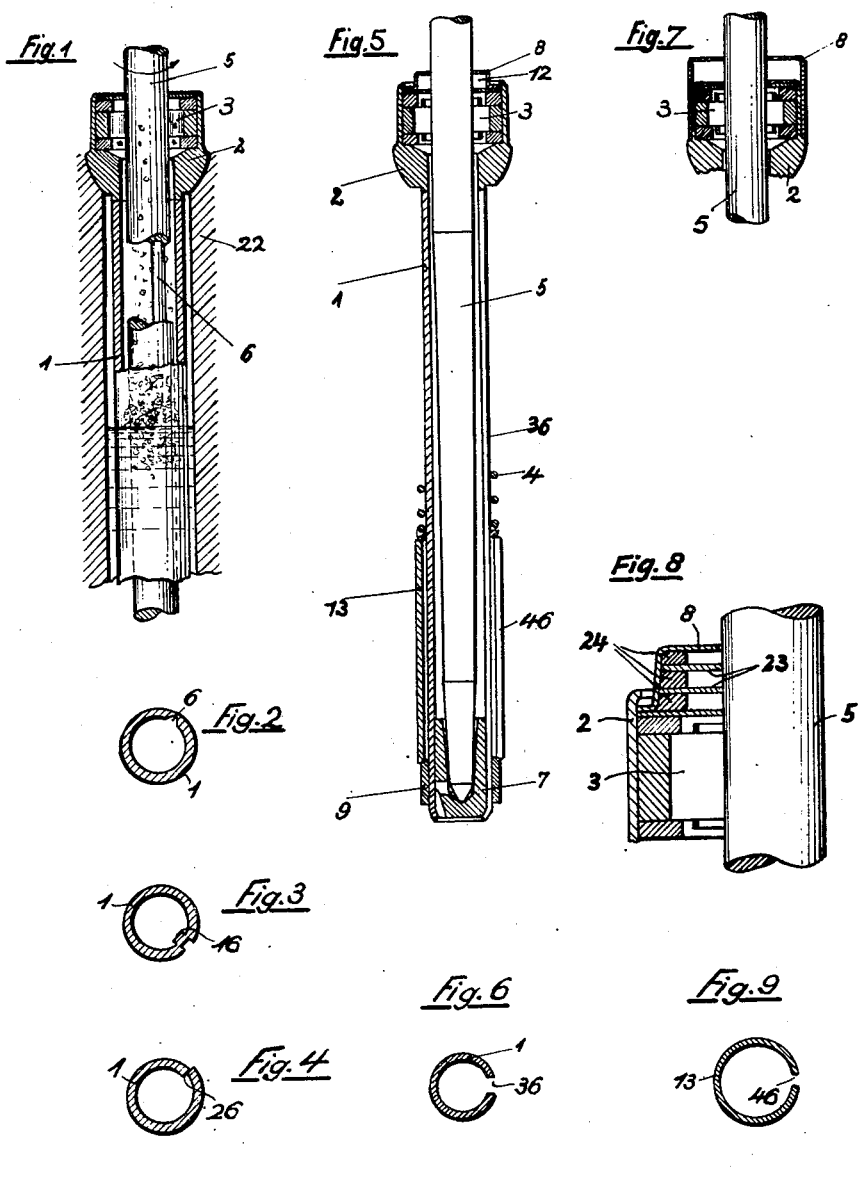

2,706,668

BEARING SLEEVE

Julius Raible, Stuttgart-Frauenkopf, Germany, assignor to SKF Kugellagerfabriken Gesellschaft mit beschraenkter Haftung, Schweinfurt, Germany Application August 17, 1950, Serial No. 179,907

9 Claims. (Cl. 308—169)

This invention relates to improvement of the lubrication of the bearings of spinning and twining spindles where an antifriction bearing is used as a neck bearing.

In such spindle assemblies, lubrication of the neck bearings is effected as a rule by traces of oil which are lifted up as the shaft is rotating. This setup which experience has shown is sufficient practically under normal operating conditions, i. e. at moderate rotary speeds and with well-balance not too heavy bobbins, is however frequently not able to stand up under aggravated conditions of operation. With lubrication refills at 5,000- to 7,000-hour intervals according to customary operational routine there are often found damages on the neck bearings of heavy-duty spindles, caused by lack of lubricant.

A number of arrangements has become known and found use aiming towards an improvement of the lifting action of oil to the bearing and ensuing better lubrication to the neck bearing. These arrangements utilize the rotation of the spindle shaft for bringing the oil upward, some of them make use even of the mechanical oscillation phenomena as are encountered on spindles. With these systems, however, it proved very difficult to control the lifting rate of lubricating oil in a way to suit the needs of the neck bearing. Excess oil lift will prove nearly as detrimental as underlubrication, since under excess amounts of oiil the neck bearing heats up, which results in increased power demand to the spindle, besides, excess lubrication of the neck bearing causes oil leakage which decreases the operational interval that can be bridged by one oil filling. As to oil-lifting effects due to spindle oscillations, it may be mentioned that spindles having well-designed oscillation-damping systems are supposed to show no oscillation to speak of at all.

According to this invention I have succeeded in obtaining adequate but economic neck bearing lubrication by a novel approach, namely by the device that oil mist or oil fume is generated inside the spindle bearing, and that the former is used for lubricating the neck bearing. Unlike known oil-mist lubricating systems for high-speed antifriction bearings it is here no additional means such as e. g. compressed air that are used for generating the oil mist, but a particular shape of the inner face of the bearing sleeve in interaction with the rotating shaft causes in the interior of the spindle casing powerful agitation of the oil interspersed with tiny bubbles of air so above the oil level an oily atmosphere is set up which provides lubrication even to the neck bearing in an adequate and economic manner.

With this type of lubrication the spindle consumes very little oil so the time intervals at which the lubricant has to be refilled can be noticeably extended. Under the idea of this invention, even larger lubricating intervals can be achieved if one takes care by suitable measures that the oil mist is prevented from escaping from the spindle assembly above the neck bearing. Such a feature introduces the further advantage that most of the oil is collected and salvaged which otherwise is thrown outside through the neck bearing after the first start upon a refill due to excess oil level in the bearing.

The novel design of the bearing sleeve makes possible at the same time simplicity of production which saves labor and material. Furthermore, this invention shows an approach toward a novel mounting pattern of the step bearing and of the components required for oscillation damping.

In the drawings accompanying this specification and forming part thereof, embodiments of this invention are shown as examples.

In the drawings:

Fig. 1 is a longitudinal cross section of a bearing sleeve designed under this invention with the spindle shaft shown partially in a full view, Figs. 2, 3 and 4 show cross-sectional views of the bearing sleeves with three different applications, Fig. 5 is a longitudinal cross section of a bearing sleeve of different design, Fig. 6 is an associated cross section of the bearing sleeve shown in Fig. 5, Fig. 7 shows in an axial cross-sectional view an arrangement for retaining lubricant which is originally in excess, Fig. 8 shows in the same manner an arrangement of different design serving the same end.

Fig. 9 is a cross-sectional view of a damping sleeve used according to Fig. 5.

In the spindle sleeve 1 which by means of the spherical boss 2 rests pivoted in the bearing casing 22 in an as such known manner, the shaft 5 of the high-speed spindle is held by the antifriction roller bearing 3, and a step bearing 7 shown in Fig. 5, but not in Fig. 1. The lubricant, e. g. oil, fills the lower section of the space between spindle sleeve 1 and spindle shaft 5, and it is taken along by the high-speed spindle shaft 5. Under this invention, however, this rotation is disturbed on purpose by surface irregularities on the interior of the spindle sleeve 1. As shown in Figs. 1 and 2, the inner face of sleeve 1 has been provided with a lengthwise slot 6 facing the rotating lubricant with an opposing edge so it causes local turbulence and entrance of tiny air bubbles in the top strata of the liquid, and furthermore the generation of foam, of rising oil droplets, and of oil mist which reaches the neck bearing 3 to take care of its positive but economic lubrication. As shown by tests, lubrication of the neck bearing can be secured in this manner even with the oil level gone down to a degree that oil-lifting to the neck bearing in the so far customary way by spindle-shaft rotation is no longer practical.

The lengthwise slot 6 may be replaced according to Fig. 3 by a longitudinal ledge-type projection 16, or according to Fig. 4 by the projecting edge of an essentially closed longitudinal slot.

Instead of the shown disturbing or deflecting faces continuing all the way in lengthwise direction there may as well be used individual pimples or depressions spaced out over the inner surface of the spindle sleeve.

Most suitable has shown to be an open longitudinal slot 36 (Figs. 5 and 6) which allows the oil to circulate from the bearing sleeve 1 into the surrounding cavity of the bearing casing 22, so the lubricant-storing volume is increased.

The open slot 36 introduces the advantage that not only it can be made rather simply but that it may readily be adapted to suit the oil requirements of the neck bearing 3, by e. g. designing it narrower up near the neck bearing 3 than below, since large volumes of oil in the spindle sleeve require less oil mist to be formed than low amounts. Furthermore in designing the width of the slot one can give consideration to the influence of the rotary speed at which the spindle operates. The slot 36 thus offers the facility of controlling the lubricating dosage according to requirements in the most straightforward manner.

With regard to production problems this slot allows the bearing sleeve to be made from open tubing rolled from sheet metal stock which is welded to the boss 2 without further machining. Even mounting of the step bearing 7 is simplified with such a design of the bearing sleeve because it no longer needs be pressed in place, and because thus no longer accurate machining of the bearing face of the step bearing in the bearing sleeve is required. It is only a shrink-on ring 9 that is applied, which besides of its duty of holding the damping elements 13, attaches the slotted bearing sleeve from the outside firmly to the step bearing.

With low amounts of oil in the spindle, there is desirable particularly good interconnection of the outer oil-filled space between casing and bearing sleeve and the inner oil-filled space between shaft and bearing sleeve, in order to obtain even under such conditions an amount of oil circulation that the formation of oil mist for neck bearing lubrication is secured. It is thus convenient to apply cutouts even on the damping box 13 located outside the bearing sleeve 1 proper, or to design it according to Figs. 5 and 9 as an open piece of tubing with a through-going slot 16 along its length.

Each time the lubricant-storing space undergoes a refill, it is customary that some more oil is filled in the spindle assembly than is exactly necessary. As a rule, such excess amounts of oil are thrown through the neck bearing out of the spindle assembly under the first hours of subsequent operation until the oil level has gone down accordingly so the oil-lifting lets off. To utilize such excess amounts for neck-bearing lubrication, and to further extend the interval which can be bridged with one refill of lubricant, it is recommended to top the neck bearing 3 by devices which on the one hand store the oil thrown out through the neck bearing, for slow release as time goes by, and which on the other hand form a better seal to the neck bearing to prevent oil mist from escaping.

In Fig. 5, this device comprises a not-removable cover 8 having a relatively large cavity 12 where the oil gets caught and from where it flows back to the spindle whenever the machine stops down.

Fig. 7 shows a similar device featuring as a difference that the cover 8 can be taken down and grease-filled, which under the starting period while oil is lifted above the neck bearing serves for oil storage, and which releases its stored lubricant by and by. Besides, such a grease fill acts as a good seal preventing oil mist from escaping.

Fig. 8 shows a labyrinth type of packing housed in cover 8 and a storing chamber comprising annular spacers 24 and discs 23 mounted between the latter.

The wide scope of the shown embodiments gives evidence to the fact that the idea of this invention can be realized beyond these examples in further versions. One might thus e. g. arrange the faces disturbing the rotation of the lubricant instead of on the bearing sleeve on any parts fixed to the bearing sleeve and not participating in the rotation. Thus I wish it to be understood that I do not desire to be limited to the exact details of construction shown herein, for obvious modifications will come natural to any person skilled in the art.

I claim:

1. In a spinning spindle assembly, in combination, an elongated spindle having a free bottom end; a bearing rotatably carrying said spindle and engaging the latter above said bottom end thereof; a sleeve having a top end portion housing said bearing, extending from the latter toward said bottom end of said spindle, and having a bottom end portion surrounding said bottom end of said spindle, said sleeve being spaced from said spindle and having its interior in communication with said bearing, and said sleeve being formed with an agitating face projecting radially from the inner face of said sleeve, being substantially parallel to the axis of said sleeve, and extending from a point adjacent said bearing to said bottom end portion of said sleeve so that when said spindle rotates in said sleeve a lubricant surrounding the lower end portion of said spindle will adhere to said spindle and be moved thereby in the direction of rotation thereof and be agitated by said agitating face to form a lubricant vapor which rises to said bearing to lubricate the latter; and support means carrying said sleeve and engaging the outer face thereof.

2. In a spinning spindle assembly, in combination, an elongated spindle having a free bottom end; a bearing rotatably carrying said spindle and engaging the latter above said bottom end thereof; a sleeve having a top end portion housing said bearing, extending from the latter toward said bottom end of said spindle, and having a bottom end portion surrounding said bottom end of said spindle, said sleeve being spaced from said spindle and having its interior in communication with said bearing, and said sleeve being formed with at least one and less than three agitating faces projecting radially from the inner face of said sleeve, being substantially parallel to the axis of said sleeve, and extending from a point adjacent said bearing to said bottom end portion of said sleeve so that when said spindle rotates in said sleeve a lubricant surrounding the lower end portion of said spindle will adhere to said spindle and be moved thereby in the direction of rotation thereof and be agitated by said agitating faces to form a lubricant vapor which rises to said bearing to lubricate the latter; and support means carrying said sleeve and engaging the outer face thereof.

3. In a spinning spindle assembly as defined in claim 2, said sleeve having only one agitating face and being in the form of a metal strip bent into tubular shape and having along the length of said sleeve abutting end faces which are staggered with respect to each other.

4. In a spinning spindle assembly as defined in claim 2, said sleeve having two agitating faces formed by opposite sides of a groove formed in the inner face of said sleeve and being substantially parallel to the axis thereof.

5. In a spinning spindle assembly as defined in claim 2, said sleeve having two agitating faces formed by opposite sides of a rib projecting inwardly from the inner face of said sleeve and being substantially parallel to the axis thereof.

6. In a spinning spindle assembly as defined in claim 2, said sleeve having two agitating faces formed by opposite sides of a slot extending through said sleeve and being substantially parallel to the axis thereof, and said support means being tubular and forming a reservoir for a lubricant located about said sleeve and extending through said slot thereof to said spindle.

7. In a spinning spindle assembly as defined in claim 6, said slot having a width which becomes gradually smaller as it approaches said bottom end portion of said sleeve.

8. In a spinning spindle assembly, in combination, an elongated spindle having a free bottom end; a bearing rotatably carrying said spindle and engaging the latter above said bottom end thereof; a sleeve having a top end portion housing said bearing, extending from the latter toward said bottom end of said spindle, and having a bottom end portion surrounding said bottom end of said spindle, said sleeve being spaced from said spindle and having its interior in communication with said bearing, and said sleeve being formed with at least one and less than three agitating faces projecting radially from the inner face of said sleeve, being substantially parallel to the axis of said sleeve, and extending from a point adjacent said bearing to said bottom end portion of said sleeve so that when said spindle rotates in said sleeve a lubricant surrounding the lower end portion of said spindle will adhere to said spindle and be moved thereby in the direction of rotation thereof and be agitated by said agitating faces to form a lubricant vapor which rises to said bearing to lubricate the latter; support means carrying said sleeve and engaging the outer face thereof; and sealing means located above said bearing for preventing the escape of lubricant vapor through said bearing.

9. In a spinning spindle assembly, in combination, an elongated spindle having a free bottom end; a bearing rotatably carrying said spindle and engaging the latter above said bottom end thereof; a sleeve having a top end portion housing said bearing, extending from the latter toward said bottom end of said spindle, and having a bottom end portion surrounding said bottom end of said spindle, said sleeve being spaced from said spindle and having its interior in communication with said bearing, and said sleeve being formed with at least one and less than three agitating faces projecting radially from the inner face of said sleeve, being substantially parallel to the axis of said sleeve, and extending from said bottom end portion of said sleeve to a point spaced from said bottom end portion a distance equal to at least one half the distance between a point adjacent said bearing and said bottom end portion; a lubricant located in said sleeve and surrounding the lower end portion of said spindle so that when the latter rotates said lubricant will adhere to said spindle and be moved thereby in the direction of rotation thereof and be agitated by said agitating faces to form a lubricant vapor which rises to said bearing to lubricate the latter, said agitating faces being substantially at right angles to the normal rotation of said lubricant; support means carrying said sleeve and engaging the outer face thereof; and sealing means located above said bearing for preventing the escape of lubricant vapor through said bearing.

(References on following page)

References Cited in the file of this patent

UNITED STATES PATENTS

| | | |
|---|---|---|
| 500,857 | Crabtree | July 4, 1893 |
| 621,294 | Culver | Mar. 14, 1899 |
| 1,869,351 | Lincoln | July 26, 1932 |
| 2,496,188 | Wiese | Jan. 31, 1950 |
| 2,516,252 | Pellerin | July 25, 1950 |
| 2,546,473 | Palmgren | Mar. 27, 1951 |
| 2,599,222 | Bergqvist | June 3, 1952 |

FOREIGN PATENTS

| | | |
|---|---|---|
| 155,761 | Great Britain | June 26, 1922 |
| 825,944 | France | Mar. 17, 1938 |